3,833,654
SWEETENERS BASED ON SYN OXIMES OF 4-(METHOXYSUBSTITUTED) - 1 - CYCLO-HEXENE-1-CARBOXALDEHYDES
Edward M. Acton, Menlo Park, Kazuko Yamamoto, Fremont, and Herbert Stone, Menlo Park, Calif., assignors to Stanford Research Institute, Menlo Park, Calif.
No Drawing. Filed May 16, 1973, Ser. No. 360,844
Int. Cl. C07c 131/10
U.S. Cl. 260—566 A          1 Claim

ABSTRACT OF THE DISCLOSURE

The 4-methoxymethyl-, 4-methoxy-, and 4-(1-methoxyethyl)-analogs (I, II, and III, respectively) of 1-cyclohexene-1-carboxaldehyde *syn*-oxime retain good levels of sweetness and taste intensity in water solution, and are free of "phenolic" or "medicinal" off-tastes.

SUMMARY OF INVENTION

The present invention rests in part on the discovery of the novel oxime compounds 4-(Methoxymethyl)-1-cyclohexene-1-carboxaldehyde, *syn*-oxime (I),
4-Methoxy-1-cyclohexene-1-carboxaldehyde *syn*-oxime (II),
4-(1-Methoxyethyl)-1-cyclohexene-1-carboxaldehyde *syn*-oxime (III), which are herein designated, for convenience, by the numerals I, II, and III, respectively. It also rests on the discovery that these compounds are sweet tasting and have utility as artificial sweeteners for use in foods, beverages and other comestibles.

The compounds of this invention have the structure

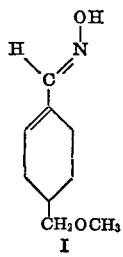   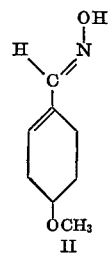   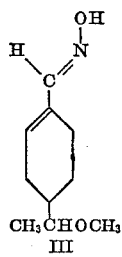
I                II                III

The water solubility and taste intensity properties of the individual oximes are such that the saturated aqueous solutions have from about 1 to 4 times the taste intensity of 0.25 molar sucrose. These are practical levels of taste intensity for use in the formulation of products in aqueous media. The proportion of the total taste identified as sweet ranges from 40 to 60%. Sweetness is accompanied by 5 to 25% bitterness, and by 20 to 30% of a taste quality identified as "menthol, mint, anise." There are no unpalatable off-tastes such as the "phenolic or medicinal" tastes which are present in some other oxime sweeteners. These properties of the oximes are listed below:

PROPERTIES OF SOME OXIMES

| Compound | I | II | III |
|---|---|---|---|
| Concentration of saturated water solution | 0.03 M | 0.05 M | 0.003 M |
| Relative taste inentsity (saturated solution vs. 0.25 M sucrose reference) | 4.0 | 0.9 | 1.4 |
| Relative taste intensity (mole oxime vs. mole sucrose) | 52 | 8 | 120 |
| Taste qualities (as percent of total taste): | | | |
| Sweet | 53 | 42 | 60 |
| Bitter | 22 | 26 | 3 |
| Menthol, mint, anise | 18 | 18 | 30 |

The compounds of the present invention, which may be said to have the general formula

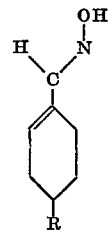

wherein R is a methoxymethyl, methoxy or 1-methoxyethyl groups can be prepared using the same general synthesis, starting from a phenol having the requisite R group in the 4-position of the ring.

These new oximes I, II, and III are obtained by chemical synthesis, using a general synthetic sequence starting from phenols with the requisite 4-substituent. Low-pressure hydrogenation with a 5% rhodium-on-alumina catalyst affords the cyclohexanols, which are oxidized with aqueous chromic acid to the cyclohexanones. The cyanohydrins are formed from the cyclohexanones and dehydrated with phosphoryl chloride-pyridine (according to the procedure of Wheeler and Lerner, J. Amer. Chem. Soc. 78, 63 (1956)) to form the α,β-unsaturated nitriles. Reduction of the latter with diisobutylaluminum hydride in benzene solution affords the aldehydes, and conventional treatment thereof with hydroxylamine affords the desired oximes. Further details of the procedures employed in forming each oxime compound of this invention are provided in the examples.

EXAMPLE 1

4-(Methoxymethyl-1-cyclohexene-1-carboxaldehyde, syn-oxime (I)

4-(methoxymethyl)phenol (IVa) (F.H.C. Stewart, J. Org. Chem. 27, 2662 (1962)) was hydrogenated with 5% rhodium-alumina catalyst (by the method of J. H. Stocker, J. Org. Chem. 27, 2288 (1962)) to give 4-(methoxylmethyl) cyclohexanol (Va) (L. N. Owen and P. A. Robins, J. Chem. Soc., 326 (1949)) in 80% yield. Oxidation with chromic acid (by the method of H. C. Brown, C. P. Garg, and K.-T. Liu, J. Org. Chem. 36, 387 (1971)) afforded the ketone 4-(methoxymethyl)cyclohexanone (VIa) (H. Musso, K. Naumann, and K. Grychtal, Chem. Ber. 100, 3614 (1967)) in 61% yield (bp 60–63° at 0.1–0.2 mm.).

This ketone (VIa) was converted with aqueous sodium cyanide-sodium bisulfite to the cyanohydrin, which was then dehydrated with phosphoryl chloride in pyridine-benzene, according to the procedure of O. H. Wheeler and I. Lerner (J. Amer. Chem. Soc. 78, 63 (1956)). The nitrile 4-(methoxymethyl)-1-cyano-1-cyclohexene (VIIa) was obtained in 70% yield, after distillation, bp 70–74° (0.2 mm.); IR μ 4.48 (CN), 6.09 (C=C); NMR (CDCl$_3$, internal TMS) δ 6.7 broad (=CH), 3.41 s (OCH$_3$).

A solution of 36 g. (0.24 mol) of nitrile (VIIa) in 50 ml. of benzene (dried over molecular sieve) was stirred under nitrogen, cooled to 15°, and treated with 175 ml. of a benzene solution (Texas Alkyls, DIBAL–H, 25% in benzene) of diisobutylaluminum hydride (0.26 mol), added dropwise during 1 hr. with cooling to maintain the reaction temperature at 20–25°. Stirring under nitrogen was continued for 1.5 hr. and the yellow solution was hydrolyzed by pouring gradually onto a mixture of 1 kg. of crushed ice and 340 ml. of concentrated hydrochloric acid. More ice was added as it melted, and 200 ml. of ether was added to keep the benzene from freezing. When the reaction solution was all added, the ice was allowed to melt and hydrolysis was completed by warming the mixture briefly to 40–50°. The organic layer was separated and the aqueous layer was extracted with three 500-ml. portions of ether. The combined organic extracts were washed with water, saturated aqueous bicarbonate solution, and water, were dried over magnesium sulfate, and concentrated *in vacuo* to give 33.5 g. of light yellow oil. Three batches of crude aldehyde were combined and distilled (78% yield), to receive 4-(methoxymethyl)-1-cyclohexene-1-carboxaldehyde (VIIIa) bp 58–61° (0.25 mm.); IR μ 5.95 (C=O), 6.09 (C=C); NMR (CDCl$_3$, internal TMS) δ 9.42 s (CH=O), 6.8 broad (=CH), 3.34 s (OCH$_3$).

The aldehyde (VIIIa) was treated with hydroxylamine hydrochloride and sodium bicarbonate in aqueous 50% ethanol, as described by Acton, Leaffer, Oliver, and Stone (J. Ag. Food Chem. *18*, 1061 (1970)). The crude oxime was crystallized by trituration with pentane (90% yield); TLC on silica gel in petroleum ether-ethyl ether (2:1), R$_f$ 0.55 with trace impurities at R$_f$ 0.50 and 0.68. Recrystallization from ether-cyclohexane and finally from aqueous ethanol afforded 69% of chromatographically homogeneous oxime 4-(methoxymethyl)-1-cyclohexene-1-carboxaldehyde, syn-oxime (I) mp 71–73°; IR μ 608 (C=C), 6.19 (C=N); NMR (CDCl$_3$, internal TMS) δ 7.68 s (CH=N), 5.95 broad (=CH), 3.38 s (OCH$_3$). This compound (I) is recovered as a ± racemic mixture.

EXAMPLE 2

4-Methoxy-1-cyclohexene-1-carboxaldehyde syn-oxime (II)

4-methoxycyclohexanone (VIb) (J. L. Mateos, H. Flores, and H. Kwart, J. Org. Chem. *37*, 2826 (1972)) was converted, as described under (VIIa), to the nitrile 4-methoxy-1-cyano-1-cyclohexene (VIIb) (75% yield), bp 124° (17 mm.); IR (film) μ 4.49 (CN), 6.08 (C=C); NMR (CDCl$_3$ internal TMS) δ 6.5 m (=CH), 3.34 s (OCH$_3$).

This nitrile (VIIb) was reduced, as described under (VIIIa), to the aldehyde 4-methoxy-1-cyclohexene-1-carboxaldehyde (VIIIb) (88%), bp 116° (18 mm.); IR (film) μ 5.93 (C=O), 6.08 (C=C).

The oxime 4-methoxy-1-cycyohexene-1-carboxaldehyde syn-oxime (II) was prepared, as described under (I), in Example 1 above, from either distilled or undistilled aldehyde, with recrystallization from ethanol-cyclohexane (60% yield), this compound (I), a ± racemic mixture having mp 80–81°; IR (Nujol) μ 6.08 (C=C), 6.19 (C=N); NMR (CDCl$_3$, internal TMS) δ 7.73 s (CH N), 5.95 m (CH), 3.5 broad m and 3.39 s (CHOCH$_3$).

EXAMPLE 3

4-(1-Methoxyethyl)-1-cyclohexene-1-carboxaldehyde syn-oxime (III)

*p*-Hydroxyacetophenone was reduced to *p*-hydroxy-α-methylbenzyl alcohol (45% yield, mp 129–131° C., using lithium aluminum hydride in tetrahydrofuran (K. Weinges, Y. Naya, F. Toribio, Chem. Ber. *96*, 2870 (1963)). Treatment with methanol and a strongly acidic ion exchange resin at room temperature for 2 hr., as described for (IVa) (F. H. C. Stewart, J. Org. Chem. *27*, 2662 (1962)) afforded 4-(1-methoxyethyl)phenol (IVc) (85% yield), mp 99–101°; TLC on silica gel in petroleum ether-ethyl ether (2:1), R$_f$ 0.45; NMR (CDCl$_3$, internal TMS) δ 7.26 d and 6.90 d (*p*-substituted phenyl, J=8.5), 4.35 q (CHO—, J=6.2 Hz.), 3.23 d (OCH$_3$, J=1 Hz.), 1.47 d (CH$_3$, J=6.2 Hz.).

The phenol (IVc) was hydrogenated (89% yield) and the crude cyclohexanol was oxidized to 4-(1-methoxyethyl)cyclohexanone (VIc) (72% yield) as described under (VIa), bp 70–72° (0.4 mm.); IR (film) μ 5.82 (C=O); NMR (CDCl$_3$, internal TMS) δ 3.42 s (OCH$_3$), 1.13 d (CH$_3$, J=6.0 Hz.).

The ketone (VIc) was treated as described under (VIIa). In dehydrating the cyanohydrin, heating the phosphoryl chloride-pyridine-benzene solution was limited to 15 min., to minimize cleavage of the methyl ether. The resulting 4-(1-methoxyethyl)-1-cyano-1-cyclohexene (VIIc) was obtained in 71% yield, bp 78–82° (0.3 mm.); IR (film) μ 4.48 (CN), 6.08 (C=C); NMR (CDCl$_3$, internal TMS) δ 6.6 broad (=CH), 3.31 s (OCH$_3$), 1.12 d (CH$_3$, J=6.2 Hz.).

The nitrile (VIIc) was reduced, as described under (VIIIa), to 4-(1-methoxyethyl)-1-cyclohexene-1-carboxaldehyde (VIIIc) (74% yield), bp 73–78° (0.5–0.7 mm.); IR (film) μ 5.92 (C=O), 6.08 (C=C); NMR (CDCl$_3$, internal TMS) δ 9.47 s (CH=O), 6.82 broad (=CH), 3.33 s (OCH$_3$), 1.14 d and 1.12 d (slight resolution of the two racemates; CH$_3$, J=6.2 Hz.).

As described under (1), the 4-(1-methoxyethyl)-1-cyclohexene-1-carboxaldehyde syn-oxime (III), in the form of a mixture of two ± racemates, was obtained from the aldehyde (VIIIc) in 70% yield, mp 63–66°; tlc on silica gel in petroleum ether-ethyl ether (2:1), R$_f$ 0.45; IR (Nujol) μ 6.10 (C=C); NMR (CDCl$_3$ internal TMS) δ 7.72 s (CH=N), 6.05 broad (=CH), 3.37 s (OCH$_3$), 1.16 d and 1.13 d (slight resolution of the two racemates; CH$_3$, J=6.2 Hz.).

The two racemic forms were separated by fractional crystallization from aqueous ethanol. Form (IIIa), mp 73–75° (NMR, δ 1.16 d, CH$_3$) was about 50% stronger in taste than form (IIIb), mp 73–74° (NMR, δ 1.13 d, CH$_3$). The taste quality of form (IIIa) was described at about 75% sweet, compared to 45% sweet for form (IIIb). The melting point was significantly depress on admixture of the (IIIa) and (IIIb) forms, mp 56–63°.

EXAMPLES 4 AND 5

In one method of application, the compounds of this invention find utility as a partial replacement of sucrose in beverages of the so-called "diet" variety. For example, in one series of tests a cola drink "control" having a pleasant sweet taste was prepared in which the sweetening component was made up of 10.25 g. sucrose (0.030M) in 100 g. beverage. Beverages of a comparable sweetness were prepared using the same cola formulation, but using, in the one case, a sweetening component made up of 5.25 g. sucrose (0.015M) together with 0.026 g. (0.0015M) of compound I in 100 g. of the beverage, and, in the other case, 5.25 g. sucrose and 0.012 g. (0.007M) of compound III in 100 g. of the beverage. The water-solubility of compounds I and II are such that the amounts thereof present in the beverage solution may be doubled, if desired.

We claim:
1. An oxime compound having the formula

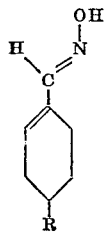

where R is a methoxymethyl, methoxy or 1-methoxyethyl group.

References Cited
UNITED STATES PATENTS
3,751,477  8/1973  Roberts _____ 260—566 A X

OTHER REFERENCES
Acton et al., J. Agr. Food Chem., vol. 18, pp. 1061–8 (1970).

BERNARD HELFIN, Primary Examiner
G. A. SCHWARTZ, Assistant Examiner

U.S. Cl. X.R.
99—141 A